Patented Feb. 23, 1937

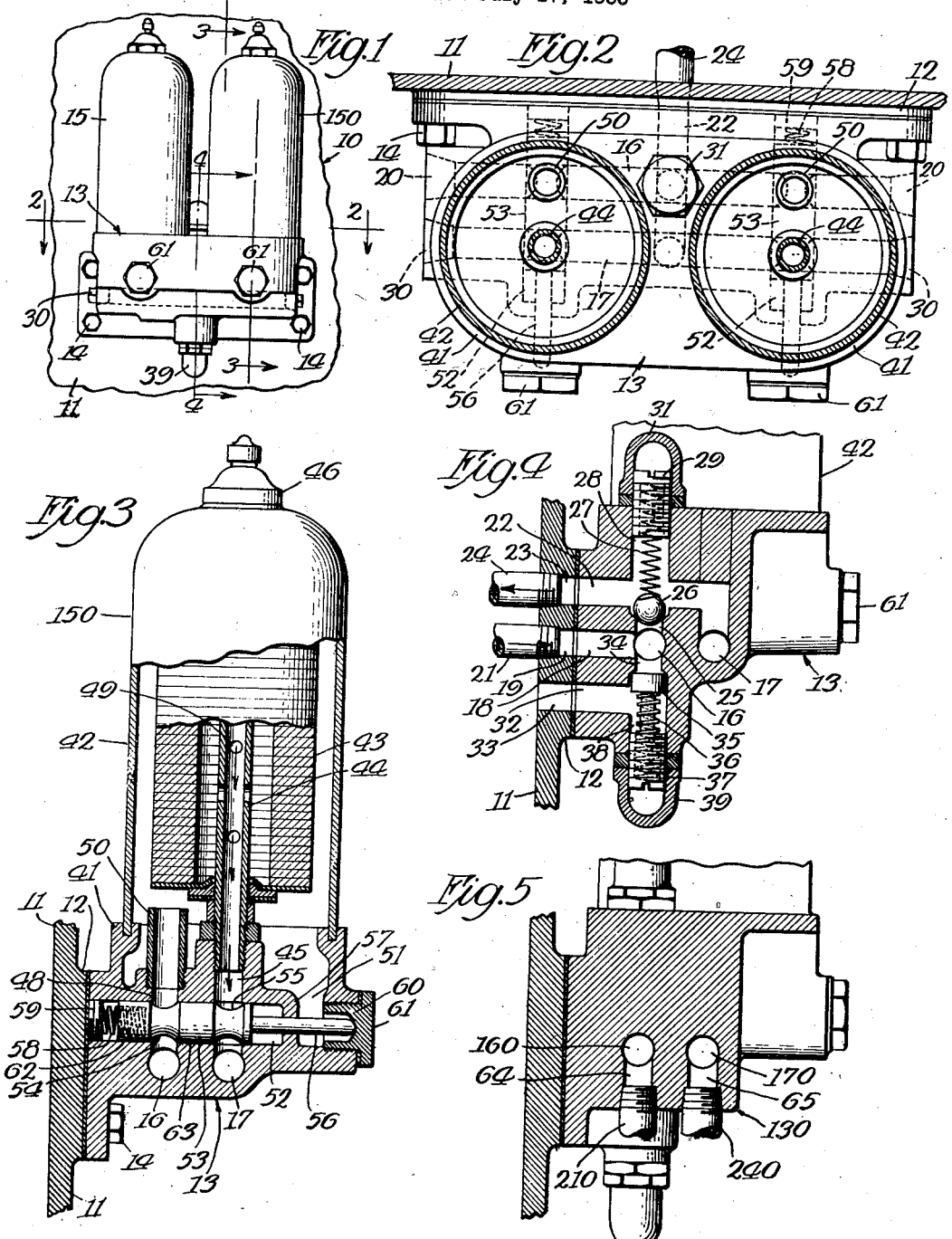

2,071,483

UNITED STATES PATENT OFFICE 2,071,483

FILTER

Charles A. Winslow, Oakland, Calif.

Application July 17, 1933, Serial No. 680,735

2 Claims. (Cl. 210—165)

This invention relates to fuel and oil filters for internal combustion engines and the like.

The principal object of the invention is the provision of a new and improved filter having novel means for controlling the movement of oil or fuel through the filter, whereby the latter may be cleaned during the operation of the engine.

Another object of the invention is the provision of new and improved means for intercepting the flow of unfiltered liquid to the filter element during the operation of the engine with which the device is associated.

A further object of the invention is the provision of a new and improved oil and/or fuel filter which is inexpensive to manufacture, efficient in operation, easily installed and that is composed of a minimum number of moving parts.

Other and further objects and advantages of the invention will appear from the following description taken in connection with the accompanying drawing, in which—

Fig. 1 is a side elevation of a portion of an engine showing the invention in position thereon;

Fig. 2 is a section on the line 2—2 of Fig. 1;

Fig. 3 is a section on the line 3—3 of Fig. 1 with parts broken away;

Fig. 4 is a section on the line 4—4 of Fig. 1;

Fig. 5 is a vertical section of a modified form of filter construction.

In the operation of internal combustion engines, it is common practice to filter the oil supplied to the bearings. The filter element at times becomes clogged and will not permit the proper flow of oil through the filter, thus necessitating the cleaning of the element. In the common use of filters, it is necessary to stop the engine in order to clean the filter. The present invention seeks to remedy this difficulty by the provision of simple means whereby the filter element, or elements, as the case may be, can be cleaned without the necessity of stopping the engine.

Referring now to the drawing, the reference character 10 designates generally an internal combustion engine of the usual or any well-known construction.

The crank case wall 11 (see Fig. 3) is provided with a boss or pad 12 to which the base of the filter 13 is attached, as by the bolts 14 which extend through flanges in the base and are tapped into the boss or pad 12.

The filter assembly may comprise a single filter casing and filter unit, or a plurality of these casings and corresponding filter elements. In the form of construction selected to illustrate one embodiment of the invention, the filter assembly comprises the two filter units 15 and 150. Since these units are substantially the same, only one need be described.

The base 13 is provided with the two passages 16 and 17 extending longitudinally thereof which may be termed the main intake and discharge passages for the filter. The outer ends of these passages are threaded for receiving suitable plugs 20 and 30 for closing the ends of these passages. The base is also provided with a transverse passage 18 which is in alignment with a corresponding opening 19 through the pad or boss 12. Secured in the inner end of the opening 19 is a pipe 21 for conducting the oil from the pump within the crank case to the filter.

The outer end of the passage 18 is in communication with the longitudinal passage 16. The pipe 21, opening 19 and passages 18 and 16 constitute what for convenience of description will be termed the intake passage of the filter.

The base 13 is also provided with a transverse passage 22 which is in communication at one end with the longitudinal passage 17 and at its other end is in alignment with an opening 23 through the pad 12. A pipe 24 secured in the inner end of the opening 23 is adapted to conduct oil to the bearings of the engine in the usual manner. The pipe 24, opening 23 and passages 22 and 17 constitute what will be termed the discharge passage of the filter.

Suitable means are provided for by-passing the unfiltered oil around the filter, or filters, when the resistance to the flow of oil through the same rises above a predetermined amount. As shown, a passage 25 normally closed by spring pressed valve 26 is employed for this purpose. This passage connects the intake and discharge passages 18 and 22. The valve 26 may be in the form of a ball yieldingly held to its seat by a spring 27 located in the bore 28 which is closed at its outer end by a screw threaded plug 29 secured in the outer end of the opening. By means of this plug, the tension of the spring 27 may be adjusted. The outer end of this spring seats in a recess in the inner end of the plug. A cap 31 constitutes a lock nut for securing the plug 29 in adjusted position.

In starting an engine in cold weather, the oil in the crank case may be too viscid to flow through either the filter or the pipe 24, and, in that event, it is necessary or desirable to shunt the oil around both the filter and the bearings.

In the form of construction shown, a transverse passage 32 is provided in the casing and this passage is in alignment with an opening 33 through the boss 12 into the interior of the crank case. A relief passage 34 connects the intake passage 18 with the relief passage 32. The passage 34 is normally closed by a spring pressed valve 35 which, in the form of construction shown, is a piston held in its seat by a spring 36 which is seated in a screw-threaded plug 37 secured in the outer end of a passage 38 in communication with the passage 32. The plug 37 may be adjusted for varying the tension of the spring 36. A cap 39 is adapted to lock the plug 37 in adjusted position and protect the outer end of the plug. The base 13 is provided on its upper side with one or more seats 41 for receiving the lower edge of the filter casing 42. As shown, the seat is in the form of a groove for receiving the lower end of said casing. Mounted within the casing 42 is the filter element 43. This element is mounted on a tube 44 which is threaded at its lower end for engaging in the upper end of the auxiliary discharge passage 45 which in turn is in communication with the main discharge passage 17. This tube extends through the casing 42 and the nut 46 engages the upper end thereof for holding the casing in position on the base 13. The filter element 43 which may consist of any suitable material, as woven wire, or a plurality of disks of filter material, is mounted on the tube 44. The tube 44 is provided with a plurality of openings 49 within the filter element 43 through which the filtered oil may pass into the passages 45 and 17 after passing through the filter element.

An auxiliary intake passage 48 extends upwardly from the main intake passage 16 and has secured therein a short tube 50 for conducting oil into the interior of the casing 42 below the filter element 43. The base 13 is provided with a sump 51 extending about the tubes 44 and 50, in which the impurities from the oil may settle.

Suitable means are provided for closing the passages leading to and from the casing 42 when it is desired to clean the filter element during the operation of the engine. In the form of construction shown, a recess or bore 52 beneath each filter unit is provided in the base 13. This bore extends transversely to and is in communication with the intake and discharge passages 16 and 17 and is closed by a plug 59 threaded in the inner end of the bore. In the form of construction shown, this bore is located above the passages 16 and 17. The bore 52 is provided with a plunger or piston 53 which has restricted portions or circumferential grooves 54 and 55 for permitting the oil to pass from the passage 16 to the tube 50 and into the casing 42 when the parts are in position shown in Fig. 3. The plunger 53 is slidably mounted in the bore 52 and is provided at its outer end with a stem 56 which is slidably mounted in an opening in the end wall 57 of the bore 52. A spring 58 in contact with the plug 59 seated in a recess in the inner end of the plunger 53 tends to force the plunger outwardly against the end wall 57. The plunger is held in position shown in Fig. 3 by a screw threaded plug 61 engaging an opening in the base 13 opposite the stem 56. This plug is provided with a recess 60 forming a seat for the outer end of the stem 56. When the plug 61 is unscrewed a sufficient distance or is removed, the plunger 53 will be forced to the right in Fig. 3 against the wall 57 and the cylindrical portions 62 and 63 of the plug will close the passages 48 and 45, respectively. The removal of the plug will permit the oil and sludge within the sump 51 to be discharged therefrom.

In the operation of the device, the oil from the crankcase is forced by a suitable pump through the intake passage 16 past the restricted portion 54 of the plunger 53 and through the passage 48 and tube 50 into the casing 42 beneath the filter element and above the sump 51. After passing through the filter element and tube 44, the oil is discharged through the passage 45 and restricted portion 55 of the plunger 53 into the discharge passage 17. Each of the filter casings 15 and 150 is provided with a plunger 53 whereby the oil may be cut off from either or both of the filters, as may be desired. When it is desired to clean either of the filters, the corresponding plug 61 is unscrewed a sufficient distance or removed which permits the spring 58 to move the plug to the right in Fig. 3 for closing the passages 48 and 45, after which, by removing the nut 46, the casing and filter element may be removed for cleaning, and returned or replaced without stopping or interfering with the operation of the engine. During the cleaning operation if both filters are being cleaned, the oil will be conducted through the bearings to the shunt passage 25. After the parts have been reassembled, the nut 61 is replaced, which, in turn, will force the plunger 53 to the left for aligning the restricted portions 54 and 55 with the passages 48 and 45, respectively. The oil will then be conducted through the filter in the usual manner.

If desired, the pipes 21 and 24 may be removed, and plugs inserted therein and those pipes connected with the ends of the passages 16 and 17 by a suitable tubular connection after the plugs 20 and 30 at one end have been removed.

In Fig. 5 is shown a modification of the device in which the pipes leading from the pump and to the bearings are connected to the intake and discharge passages 160 and 170, respectively, from the lower side of the casing 130. In this construction, short passages 64 and 65 extend from the lower portion of the base 130 to the passages 160 and 170, respectively. The walls of the outer ends of these short passages 64 and 65 are threaded for receiving the threaded ends of the pipes 210 and 240, respectively.

When it is desired to use the filter for filtering the fuel instead of the oil, the intake and discharge pipes may be connected at either end of the passages 16 and 17 by removing the plugs 20 and 30, or in the form of construction shown in Fig. 5, they may be connected to the passages 64 and 65, as shown in that figure.

Where a plurality of filter units are employed, one at a time may be cleaned while the oil is being filtered by the other unit or units. In that manner, the oil may be filtered without stopping the engine and without the necessity of supplying unfiltered oil to the engine during the cleaning operation.

The spring 36 is heavier than the spring 27 whereby when the oil forced through the intake passage of the filter will, when it meets resistance above a predetermined amount to its circulation through the filter, unseat the valve 26 and shunt the unfiltered oil around the filter. If the resistance further increases, the valve 35 will finally become unseated and the oil will flow through the relief passage 32.

It is thought from the foregoing taken in connection with the accompanying drawing that the construction and operation of my device will be apparent to those skilled in the art and that changes in size, shape, proportion and details of construction may be made without departing from the spirit and scope of the appended claims.

I claim as my invention:

1. In mechanism for filtering a fluid for use in an internal combustion engine, a plurality of filtering units, a common base for said units, means for attaching said base to an engine, common intake and discharge passages for said units, a sump within the lower portion of each unit, a passage from each sump to the exterior of said unit, means comprising a spring-pressed plunger for selectively simultaneously opening certain of said last-named passages and for intercepting the flow of said fluid to and from certain of said units to the exclusion of the remainder, and a closure for said sump engaging said plunger for holding the same in retracted position, whereby when said closure is removed said plunger will automatically close the intake and discharge passages to the corresponding filter and the oil within said filter may drain from said sump, thus permitting said filter to be cleaned without affecting the operation of the remaining filter.

2. A base for a filter comprising a body portion, a sump in said body portion, said sump having a discharge opening, an attaching flange for said body portion, main intake and discharge passages within said body portion, auxiliary intake and discharge passages in communication with said main intake and discharge passages, respectively, said body portion being provided with a base extending transversely to and intercepting said auxiliary passages, a plunger having portions for simultaneously closing said last named passages when said plunger is in one position and for opening said passages when in another position, resilient means for normally holding said plunger in extended position to close said auxiliary passages, a cap for holding said plunger in retracted position for opening said last-named passages, said cap constituting a closure for said sump discharge passage, a by-pass within said base between said main intake and discharge passages, a spring-pressed valve in said by-pass, a relief passage within said base in communication with said main intake passage, and a spring-pressed valve in said relief passage.

CHARLES A. WINSLOW.